US010744452B2

(12) United States Patent
Wei et al.

(10) Patent No.: US 10,744,452 B2
(45) Date of Patent: Aug. 18, 2020

(54) METHOD FOR WASTE GAS DEDUSTING AND DEDUSTING AGENT

(71) Applicants: BEIJING BOYUAN HENGSHENG HIGH-TECHNOLOGY CO., LTD, Beijing (CN); YONGFENG BOYUAN INDUSTRY CO., LTD., JIANGXI PROVINCE, Ji'an, Jiangxi (CN)

(72) Inventors: Xionghui Wei, Beijing (CN); Daolong Gao, Jiangxi (CN); Meihua Zou, Beijing (CN); Chun Hu, Beijing (CN)

(73) Assignees: BEIJING BOYUAN HENGSHENG HIGH-TECHNOLOGY CO., LTD., Beijing (CN); YONGFENG BOYUAN INDUSTRY CO., LTD., JIANGXI PROVINCE, Ji'an, Jiangxi (CN)

(*) Notice: Subject to any disclaimer, the term of this patent is extended or adjusted under 35 U.S.C. 154(b) by 451 days.

(21) Appl. No.: 15/534,341

(22) PCT Filed: Jan. 15, 2016

(86) PCT No.: PCT/CN2016/070998
§ 371 (c)(1),
(2) Date: Jun. 8, 2017

(87) PCT Pub. No.: WO2016/116007
PCT Pub. Date: Jul. 28, 2016

(65) Prior Publication Data
US 2017/0333830 A1 Nov. 23, 2017

(30) Foreign Application Priority Data
Jan. 23, 2015 (CN) .......................... 2015 1 0033694

(51) Int. Cl.
*B01D 17/02* (2006.01)
*B01D 19/00* (2006.01)
(Continued)

(52) U.S. Cl.
CPC ..... *B01D 53/1425* (2013.01); *B01D 17/0214* (2013.01); *B01D 19/00* (2013.01);
(Continued)

(58) Field of Classification Search
CPC ................ B01D 17/0214; B01D 19/00; B01D 2252/103; B01D 2252/20;
(Continued)

(56) References Cited

U.S. PATENT DOCUMENTS 2,921,911 A * 1/1960 Staubly ...................... D06L 4/23
252/187.25
3,959,129 A * 5/1976 White .................... B01D 37/00
210/667
(Continued)

FOREIGN PATENT DOCUMENTS

CN  1157579 A   8/1997
CN  2354633 Y   12/1999
(Continued)

OTHER PUBLICATIONS

Japanese Patent Office, Office Actions for Application No. 2017-537977, dated Aug. 3, 2018.
(Continued)

*Primary Examiner* — Cabrena Holecek
(74) *Attorney, Agent, or Firm* — Novick, Kim & Lee, PLLC; Allen Xue

(57) ABSTRACT

A method and device for waste gas dedusting and a dedusting agent used in the method. A dust-containing waste gas (1) and an organic dedusting agent (4) are introduced into a dedusting tower (3), respectively, and make contact with each other in the tower; at least part of the water vapor in the dust-containing waste gas (1) is condensed, and the organic dedusting agent (4) and the condensed water adsorb solid particles, acidic pollutants, organic pollutants and/or heavy (Continued)

metal compounds in the dust-containing waste gas; and the resulting purified gas (2) is emptied out or subjected to a subsequent process. The organic dedusting agent (4) comprises a non-toxic and high boiling point organic solvent composition, being two or more selected from cooking oil, silicone oil, modified silicone oil, liquid-state asphalt oil, tung tree seed oil, liquid-state paraffin wax oil, mineral oil, palm oil and waste cooking oil.

11 Claims, 4 Drawing Sheets

(51) Int. Cl.
| | |
|---|---|
| B01D 47/06 | (2006.01) |
| B01D 47/14 | (2006.01) |
| B01D 53/14 | (2006.01) |
| B01D 53/18 | (2006.01) |
| B01D 53/02 | (2006.01) |
| B01D 47/00 | (2006.01) |

(52) U.S. Cl.
CPC ............ *B01D 47/00* (2013.01); *B01D 47/06* (2013.01); *B01D 47/14* (2013.01); *B01D 53/02* (2013.01); *B01D 53/14* (2013.01); *B01D 53/1456* (2013.01); *B01D 53/1487* (2013.01); *B01D 53/1493* (2013.01); *B01D 53/18* (2013.01); *B01D 2252/103* (2013.01); *B01D 2252/20* (2013.01); *B01D 2252/205* (2013.01); *B01D 2257/2045* (2013.01); *B01D 2257/2047* (2013.01); *B01D 2257/2064* (2013.01); *B01D 2257/60* (2013.01); *B01D 2258/0283* (2013.01)

(58) Field of Classification Search
CPC ...... B01D 2252/205; B01D 2257/2045; B01D 2257/2047; B01D 2257/2064; B01D 2257/60; B01D 2258/0283; B01D 47/00; B01D 47/06; B01D 47/14; B01D 53/02; B01D 53/14; B01D 53/1425; B01D 53/1456; B01D 53/1487; B01D 53/1493; B01D 53/18
See application file for complete search history.

(56) References Cited

U.S. PATENT DOCUMENTS

| | | | |
|---|---|---|---|
| 4,028,072 | A | 6/1977 | Braun et al. |
| 4,473,380 | A * | 9/1984 | Voliva .................... B01D 51/10 34/80 |
| 6,361,586 | B1 | 3/2002 | Dziembowski et al. |
| 2003/0056648 | A1 | 3/2003 | Fornai et al. |
| 2010/0229725 | A1* | 9/2010 | Farsad ............... B01D 53/1456 96/74 |

FOREIGN PATENT DOCUMENTS

| | | |
|---|---|---|
| CN | 201807279 U | 4/2011 |
| CN | 102716656 A | 10/2012 |
| CN | 103212257 A | 7/2013 |
| CN | 203830349 U | 9/2014 |
| CN | 104667646 A | 6/2015 |
| DE | 102009041593 A1 | 3/2011 |
| EP | 0652038 A1 | 5/1995 |
| JP | 1972008058 A | 4/1972 |
| JP | S5166278 A | 6/1976 |
| JP | 54-078854 A | 6/1979 |
| JP | H10505278 A | 5/1998 |
| JP | H10328518 A | 12/1998 |
| JP | H11165025 A | 6/1999 |
| JP | 2000279737 A | 10/2000 |
| JP | 2001505478 A | 4/2001 |
| JP | 2004095602 A | 3/2004 |
| JP | 2004197624 A | 7/2004 |
| JP | 2004526931 A | 9/2004 |
| JP | 2005118778 A | 5/2005 |
| JP | 2005238220 A | 9/2005 |
| JP | 3124354 U | 8/2006 |
| JP | 2006218392 A | 8/2006 |
| JP | 2008231749 A | 10/2008 |
| JP | 2010128049 A | 6/2010 |
| JP | 2011098340 A | 5/2011 |
| JP | 2011218326 A | 11/2011 |
| JP | 2014014799 A | 1/2014 |
| KR | 10-2013-0134676 A | 12/2013 |

OTHER PUBLICATIONS

European Patent Office, Supplementary European Search Report, dated Dec. 21, 2017.
Korean Patent Office, Office Action for Application No. KR 10-2017-7019772, dated Oct. 5, 2018.

\* cited by examiner

METHOD FOR WASTE GAS DEDUSTING AND DEDUSTING AGENT

TECHNICAL FIELD

The present invention relates to the field of waste gas dedusting, and specifically to a method, an apparatus for dedusting of flue gases or various combustion exhaust (waste) gases as well as a dedusting agent.

BACKGROUND ART

A large quantity of flue gases are produced from fossil fuel combustion and discharged into atmosphere. In addition to sulfur dioxide, sulfur trioxide, hydrogen chloride, hydrogen fluoride, nitrogen oxides, a small quantity of harmful organic substances and heavy metal compounds, flue gases contain a large quantity of dusts, and there are tiny hydrophilic and lipophilic particles included in these dusts, wherein said tiny hydrophilic and lipophilic particles are mainly comprised of calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles and phosphate particles. These particles are discharged together with the flue gases into atmosphere, and heavy metal compounds, sulfur dioxide, sulfur trioxide, hydrogen chloride, hydrogen fluoride, nitrogen oxides, dioxins, polycyclic aromatic hydrocarbons, other harmful organic substances, bacteria, and the like are readily adsorbed on the surface of these particles, causing a significant increase in the content of atmospheric suspended particulates (i.e., PM100, PM10, PM2.5, etc.), resulting in the phenomena of haze and atmospheric photochemical reactions, and causing serious environmental pollution.

Currently, the vast majority of waste gas desulfurization methods adopt limestone or lime wet methods for desulfurization.

In the limestone wet desulfurization method, calcium carbonate stones from mines are broken by a crusher, ground into fine powders with a mesh number greater than 325 by a ball mill, and then formulated into a slurry containing 10%-15% calcium carbonate powder. In a desulfurization tower, the calcium carbonate slurry contacts with the flue gas, and sulfur dioxide in the gas reacts with calcium carbonate in the slurry to produce calcium sulfite. In an air forced oxidation layer of the desulfurization tower, the calcium sulfite slurry is oxidized into calcium sulfate. Calcium sulfate, which also contains some calcium sulfite, is separated, and calcium sulfite will decompose and release sulfur dioxide, resulting in secondary pollution. In particular, the tiny hydrophilic and lipophilic particles contained in the ground calcium carbonate slurry are brought out by the flue gas and discharged into atmosphere, and heavy metal compounds, sulfur dioxide, sulfur trioxide, hydrogen chloride, hydrogen fluoride, nitrogen oxides, dioxins, polycyclic aromatic hydrocarbons, other harmful organic substances, bacteria, and the like are readily adsorbed on the surface of these particles, causing a significant increase in the content of atmospheric suspended particulates (i.e., PM100, PM10, PM2.5, etc.), resulting in the phenomena of haze and atmospheric photochemical reactions, and causing serious environmental pollution. Wherein, said tiny hydrophilic and lipophilic particles are mainly comprised of calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles and phosphate particles, and the like.

In the lime wet desulfurization process, calcined calcium oxide is utilized to react with water, producing an aqueous emulsion of calcium hydroxide, which is formulated into a slurry containing 10%-15% calcium hydroxide. In a desulfurization tower, the calcium hydroxide slurry contacts with the flue gas, and sulfur dioxide in the gas reacts with calcium hydroxide in the slurry to produce calcium sulfite, thus the calcium hydroxide slurry is converted into a calcium sulfite slurry. In an air forced oxidation layer of the desulfurization tower, the calcium sulfite slurry is oxidized into calcium sulfate, thus the calcium sulfite slurry is converted into a calcium sulfate slurry. The calcium sulfate slurry flows out of the desulfurization tower and enters a separator for separation of calcium sulfate from the slurry. Separated calcium sulfate also contains some solid wastes such as calcium sulfite, calcium carbonate and unreacted calcium hydroxide, and calcium sulfite will decompose and release sulfur dioxide, resulting in pollution transfer and secondary pollution. Besides, in the calcination process for producing calcium oxide, a large quantity of coals are consumed, which also causes serious pollution. At the same time, since tiny hydrophilic and lipophilic particles contained in the calcium hydroxide slurry are brought out by the flue gas and discharged into atmosphere, and heavy metal compounds, sulfur dioxide, sulfur trioxide, hydrogen chloride, hydrogen fluoride, nitrogen oxides, dioxins, polycyclic aromatic hydrocarbons, other harmful organic substances, bacteria, and the like are readily adsorbed on the surface of these particles, causing a significant increase in the content of atmospheric suspended particulate (i.e., PM100, PM10, PM2.5, etc.), resulting in the phenomena of haze and atmospheric photochemical reactions, and causing serious environmental pollution. Wherein, said tiny hydrophilic and lipophilic particles are mainly comprised of calcium salt particles, aluminum salt particles, magnesium salt particles, titanium salt particles, iron salt particles, lead salt particles, zinc salt particles, cobalt salt particles, rare earth element particles, radioactive element particles and particles of other harmful elements, as well as mineral particles such as silica particles, mullite particles, silicate particles and phosphate particles, and the like.

After being desulfurized by limestone or lime wet method, waste gases contain a large quantity of tiny particles that cannot be removed by conventional dedusting methods (such as bag-type dedusting method). If the waste gases are discharged directly into atmosphere without being further dedusted, phenomena of haze and atmospheric photochemical reactions will be strengthened significantly. In particular, organic substances that are extremely hazardous to human and creatures cannot be removed from the discharged waste gases, and discharging these organic substances into atmosphere will seriously affect and endanger human health.

Conventional waste gas dedusting methods include electrostatic dedusting method, cyclone dedusting method, bag-type dedusting method, water-dampness type dedusting method, and the like.

The basic principle of electrostatic dedusting method is that, the dust-containing gas is electrically separated while passing through a high-voltage electrostatic field, whereby dust particles combine with negative ions and become negatively charged, then run towards anode surface, being discharged and deposited. In a strong electric field, air molecules are ionized into positive ions and electrons, and electrons encounter the dust particles while running towards the positive electrode, so that the dust particles are negatively charged, adsorbed to the positive electrode and collected. With technical innovation, there is also a way to use negative electrode plates for dust collection. A greatest disadvantage of electrostatic dedusting method is that due to the small size of the gap between electrode plates, the gap is easily blocked by the dusts deposited on the electrode plate. Especially when the particles have a high viscosity, it is more likely that they block the gap between electrode plates and are difficult to be removed, so that the electrostatic dedustors lose their dedusting effects with an increased resistance. However, when the gap between electrode plates enlarges, a higher voltage is required for effecting dust removal, otherwise there is no dedusting capability. A higher plate voltage is likely to cause serious safety accidents. And a high manufacturing requirement for equipment exists with complex structures, thus manufacturing costs rise significantly. Moreover, the electrostatic dedusting method is only applicable to the dedusting for charged particles, and there is a certain range of application for the dust concentration of the gas to be purified.

In cyclone dedusting method, a dust-containing gas is subjected to rotary motion in a cyclone dedustor, creating centrifugal force to separate dusts from the gas, thus the separation effect is achieved. Cyclone dedusting method is characterized by simple equipment and low costs; but there is a disadvantage of poor separation effect that only large dust particles can be separated, leaving no effect for tiny particles.

In the bag-type dedusting method, a bag is fixed, such that a dust-containing gas flows from outside the bag to inside thereof. When the dust-containing gas is passing through the outer surface of the bag, dusts will be blocked outside by the bag fibers, while the gas is allowed to enter the bag, and dusts in the gas are removed in this way. The bag-type dedusting method is characterized by simple equipment, low costs and simple operations. Its disadvantage is yet very significant that, when the dusts are strongly adhesive, the bag is very likely to become caked and blocked, causing a loss of filtration effect and a sharply increased resistance, and production cannot be carried out. As the bag-type dedusting method relies on gas filtration by fiber bag for dust removal, its filtration effect is thus dependent on the pore size of the bag fibers. However, the smaller the pore size is, the greater will the resistance be. Dust particles larger than the pore size of the bag fibers can be removed, while those smaller than the pore size of the bag fibers will pass through the bag with the gas and cannot be removed.

In the water-dampness type dedusting method, water is sprayed directly into a dust-containing gas stream, and water-wettable particles in the gas can be agglomerated into large particulates by water and precipitate, so that the dusts are removed. With the water-dampness type dedusting method, various hydrophilic particles in the gas can be removed, whereas lipophilic particles cannot be removed. Although its dedusting effect is better than that of bag-type dedusting, as water has a boiling point of mere 100° C. and vaporizes easily, the vaporized water will be taken away by the gas. When the gas temperature is high, water loss is serious. The water-dampness type dedusting method is especially not suitable for water-deficient areas. As wet dedusting requires a consumption of a lot of water, various industrial alkaline wastewaters are usually taken as dedusting agents in practical use, but a higher requirement for dust-containing wastewater recycling and processing is also raised. Meanwhile, conventional methods of flue gas dedusting are incapable of removing dioxins, polycyclic aromatic hydrocarbons, other organic substances and heavy metal compounds in gases.

SUMMARY OF INVENTION

An object of the present invention is to provide a process for efficiently removing particulates and organic contaminants from waste gases. To solve the above issues, the following technical solutions are provided:

A waste gas dedusting process comprises the following steps: a dust-containing waste gas and an organic dedusting agent are introduced into a dedusting tower respectively, and come into contact in the tower; at least part of the water vapor in the dust-containing waste gas is condensed; solid particles, acidic contaminants, organic contaminants and/or heavy metal compounds in the dust-containing waste gas are adsorbed by the organic dedusting agent and the condensed water; and the resulting purified gas is vented or subjected to a subsequent process.

As a preferred embodiment, a mixed solution of the organic dedusting agent that has adsorbed solid particles, acidic contaminants, organic contaminants and/or heavy metal compounds and the condensed water enters a filter for solid-liquid separation, and ash dregs discharged from the filter are further treated or recycled for use; the resulting filtrate enters a storage tank for oil-water separation, aqueous phase at the lower layer is discharged and further treated or recycled for use, and organic dedusting agent at the upper layer is still returned to the dedusting tower for use.

As a preferred embodiment, a countercurrent waste gas dedusting process is adopted, that is, the dust-containing waste gas enters a countercurrent dedusting tower from the lower part thereof, the organic dedusting agent enters the countercurrent dedusting tower from the upper part thereof, and contacts with the dust-containing waste gas countercurrently in the tower; the resulting purified gas is vented from the top of the countercurrent dedusting tower or subjected to a subsequent process; and the mixed solution of the organic dedusting agent that has adsorbed solid particles, acidic contaminants, organic contaminants and/or heavy metal compounds and the condensed water is discharged from the bottom of the countercurrent dedusting tower.

As a preferred embodiment, a cocurrent waste gas dedusting process is adopted, that is, both the dust-containing waste gas and the organic dedusting agent enter a cocurrent dedusting tower from the upper part thereof, and come into contact cocurrently in the tower; solid particles, acidic contaminants, organic contaminants and/or heavy metal compounds in the dust-containing waste gas are adsorbed by the organic dedusting agent and the condensed water, and the resulting gas and liquid in a mixture enter a gas-liquid separator together; the purified gas acquired from gas-liquid separation is vented from the top of the gas-liquid separator or subjected to a subsequent process, and the mixed solution of the organic dedusting agent that has adsorbed solid particles, acidic contaminants, organic contaminants and/or heavy metal compounds and the condensed water is discharged from the bottom of the gas-liquid separator.

As a preferred embodiment, a hybrid-current waste gas dedusting process is adopted, that is, both the dust-containing waste gas and the organic dedusting agent enter a cocurrent dedusting tower from the upper part thereof, and come into contact cocurrently in the tower; the water vapor in the dust-containing waste gas is at least partially condensed, and at least part of the solid particles, acidic contaminants, organic contaminants and/or heavy metal compounds in the dust-containing waste gas are adsorbed by the organic dedusting agent and the condensed water; the gas-liquid mixture thus formed enters a countercurrent dedusting tower through the lower part of the cocurrent dedusting tower, and contacts in the tower countercurrently with the organic dedusting agent introduced from the upper part of the countercurrent dedusting tower; the resulting purified gas is vented from the top of the countercurrent dedusting tower or subjected to a subsequent process, and the mixed solution of the organic dedusting agent that has adsorbed solid particles, acidic contaminants, organic contaminants and/or heavy metal compounds and the condensed water is collected at the bottom of the countercurrent dedusting tower.

As a preferred embodiment, part of the mixed solution of the organic dedusting agent and the condensed water at the bottom of the countercurrent dedusting tower is extracted by an internal circulation pump as an internal circulation dedusting agent, sprayed from the upper part of the cocurrent dedusting tower and contacts with the dust-containing waste gas cocurrently, and/or sprayed from the middle part of the countercurrent dedusting tower and contacts with the dust-containing waste gas countercurrently.

As a preferred embodiment, the organic dedusting agent at the upper layer in said storage tank is extracted by a circulation pump, enters the countercurrent dedusting tower for recycle use, and/or enters the cocurrent dedusting tower for recycle use.

As a preferred embodiment, the organic dedusting agent at the upper layer in said storage tank is extracted by a circulation pump, cooled by a coolant in a heat exchanger, and then enters the countercurrent dedusting tower for recycle use, and/or enters the cocurrent dedusting tower for recycle use.

As a preferred embodiment, a packing layer can be provided in said dedusting tower.

As a preferred embodiment, in said waste gas dedusting process, the organic dedusting agent contacts with the dust-containing waste gas countercurrently, such that the dust-containing waste gas is cooled to below 80° C.

As a preferred embodiment, the organic dedusting agent introduced into the dedusting tower has a temperature lower than 80° C.

As a preferred embodiment, the coolant that is warmed by heat absorption is subjected to afterheat recovery.

As a preferred embodiment, the waste gas purified by dedusting can be further subjected to a subsequent process of desulfurization and/or denitration treatment.

The present invention also provides an apparatus for waste gas dedusting, comprising a dedusting tower, a filter and a storage tank, wherein the dedusting tower is provided with a dust-containing waste gas inlet and an organic dedusting agent inlet; the filter is connected to the bottom of the dedusting tower, and the storage tank is connected to the filter; the organic dedusting agent contacts with the dust-containing waste gas in the dedusting tower, the water vapor in the dust-containing waste gas is at least partially condensed, and adsorbs the solid particles, acidic contaminants, organic contaminants and/or heavy metal compounds in the dust-containing waste gas; a mixed solution of the organic dedusting agent after adsorption and the condensed water enters the filter for solid-liquid separation, the resulting ash dregs are discharged from the filter, and the resulting filtrate enters the storage tank, precipitates and becomes layered; the aqueous phase at the lower layer of the storage tank is discharged, and the organic dedusting agent at the upper layer is optionally returned to the dedusting tower for use.

As a preferred embodiment, said dust-containing waste gas inlet is in the lower part of the dedusting tower, and the organic dedusting agent inlet is in the upper part of the dedusting tower; the organic dedusting agent contacts with the dust-containing waste gas countercurrently in the tower, and the resulting purified gas is vented from the top of the dedusting tower or subjected to a subsequent process.

As a preferred embodiment, said apparatus further comprises a gas-liquid separator, and the gas-liquid separator is connected to the bottom of the dedusting tower; both said dust-containing waste gas inlet and the organic dedusting agent inlet are in the upper part of the dedusting tower, the organic dedusting agent contacts with the dust-containing waste gas in the tower cocurrently, and the solid particles, acidic contaminants, organic contaminants and/or heavy metal compounds in the dust-containing waste gas are adsorbed by the organic dedusting agent and the condensed water; the resulting gas and liquid in a mixture enter the gas-liquid separator together for gas-liquid separation, and then the purified gas is vented from the top of the gas-liquid separator or subjected to a subsequent process; the mixed solution of the organic dedusting agent that has adsorbed solid particles, acidic contaminants, organic contaminants and/or heavy metal compounds and the condensed water is discharged from the bottom of the gas-liquid separator, and enters the filter for solid-liquid separation.

As a preferred embodiment, said apparatus comprises a cocurrent dedusting tower and a countercurrent dedusting tower, both the dust-containing waste gas and the organic dedusting agent enter the cocurrent dedusting tower from the upper inlet(s) thereof, and come into contact cocurrently in the tower; the water vapor in the dust-containing waste gas is at least partially condensed, and at least part of the solid particles, acidic contaminants, organic contaminants and/or heavy metal compounds in the dust-containing waste gas are adsorbed by the organic dedusting agent and the condensed water; the gas-liquid mixture thus formed enters the countercurrent dedusting tower through the lower part of the cocurrent dedusting tower, and contacts in the tower countercurrently with the organic dedusting agent introduced from the upper part of the countercurrent dedusting tower; the resulting purified gas is vented from the top of the countercurrent dedusting tower or subjected to a subsequent process, and the mixed solution of the organic dedusting agent that has adsorbed solid particles, acidic contaminants, organic contaminants and/or heavy metal compounds and the condensed water is collected at the bottom of the countercurrent dedusting tower.

As a preferred embodiment, said apparatus further comprises an internal circulation pump, and part of the mixed solution of the organic dedusting agent and the condensed water is extracted from the bottom of the countercurrent dedusting tower, sprayed from the upper part of the cocurrent dedusting tower and contacts with the dust-containing waste gas cocurrently, and/or sprayed from the middle part of the countercurrent dedusting tower and contacts with the dust-containing waste gas countercurrently.

As a preferred embodiment, said apparatus further comprises a circulation pump, and the organic dedusting agent at the upper layer in the storage tank is extracted by the circulation pump, and introduced into the countercurrent dedusting tower for recycle use and/or into the cocurrent dedusting tower for recycle use.

As a preferred embodiment, said apparatus further comprises a circulation pump and a heat exchanger, the organic dedusting agent at the upper layer in the storage tank is extracted by the circulation pump, cooled by a coolant in the heat exchanger, and then enters the countercurrent dedusting tower for recycle use, and/or enters the cocurrent dedusting tower for recycle use.

As a preferred embodiment, said apparatus further comprises a heat pump system, such that the coolant that is warmed by heat absorption is subjected to afterheat recovery.

As a preferred embodiment, a packing layer or an atomizing nozzle is provided in the dedusting tower for enlarging the gas-liquid contact surface.

As a preferred embodiment, said apparatus can be further used in combination with a desulfurization and/or denitration device.

Further, the present invention provides an organic dedusting agent, which comprises a non-toxic high boiling point organic solvent composition, being two or more selected from edible oil, silicone oil, modified silicone oil, liquid asphalt oil, tung seed oil, liquid paraffin oil, mineral oil, palm oil and waste cooking oil.

As a preferred embodiment, said edible oil can be selected from one or more of peanut oil, salad oil, olive oil, castor oil, camellia seed oil, rape seed oil, corn oil, various plant germ oils and soybean oil.

As a preferred embodiment, said organic dedusting agent comprises a silicon-based modifier, said silicon-based modifier is preferably a silicone oil or a modified silicone oil.

As a preferred embodiment, said organic dedusting agent comprises a high boiling point edible oil and a silicon-based modifier, said silicon-based modifier is preferably a silicone oil or a modified silicone oil.

As a preferred embodiment, said organic dedusting agent further contains water.

As a preferred embodiment, said water may be condensed water obtained by condensation of the water vapor in the dust-containing waste gas.

As a preferred embodiment, said modified silicone oil is preferably modified by hydroxylation and/or amination and/or carboxylation and/or acylation.

The present invention has the following beneficial effects:

Said waste gas dedusting process of the present invention is characterized in that, a water-insoluble non-toxic organic dedusting agent is brought into contact directly with a flue gas or various combustion exhaust (waste) gases, the dusts in the gas are adsorbed by the organic dedusting agent, and the gas is directly cooled down to a temperature of below 80° C., and HCl, HF, dioxins, polycyclic aromatic hydrocarbons, other organic substances and heavy metal compounds in the gas can also be adsorbed simultaneously by the dedusting agent. As some water vapor is contained more or less in the waste gas, while the dedusting agent and the waste gas come into contact, part of the water vapor will be condensed into water droplets, by means of which hydrophilic particles of various sizes in the waste gas will be agglomerated into large particulates and enriched in an oil-water mixed solution composed of the dedusting agent and the condensed water; meanwhile, with the organic dedusting agent, lipophilic particles of various sizes in the waste gas will also be agglomerated into large particulates and enriched in the oil-water mixed solution, which is composed of the dedusting agent and the condensed water. The hydrophilic particulates of various sizes and the lipophilic particulates of various sizes that enter the oil-water mixed solution, which is composed of the organic dedusting agent and the condensed water, will be further agglomerated, gradually grow into larger particulates, and be deposited to the bottom of the oil-water mixed solution. In the meanwhile, the oil-water mixed solution is divided into an aqueous layer and an organic dedusting agent layer. While in the process of agglomeration and gradual growth of the particles, the adsorbed HCl, HF, dioxins, polycyclic aromatic hydrocarbons, other organic substances and heavy metal compounds will be adsorbed and wrapped by the various particles adsorbed in the oil-water mixed solution, and then deposited together to the bottom of the oil-water mixed solution to form a layer of ash dregs, above which is an aqueous layer, and the uppermost layer is the organic dedusting agent layer, and the organic dedusting agent can be recycled for use; the layer of ash dregs can be used to extract valuable substances; the aqueous layer will further contain a large amount of HCl, HF, and a small amount of dioxins, polycyclic aromatic hydrocarbons, other organic substances and heavy metal compounds and so on, which need to be further treated before discharging or recycling. The method can effectively remove dusts (including PM100, PM10, PM2.5 and even smaller particles, etc.) from waste gases, and can also remove HCl, HF, dioxins, polycyclic aromatic hydrocarbons, other organic substances, heavy metal compounds and the like from waste gases.

The basic principle of dedusting by the organic dedusting agent according to the present invention is based on a physical adsorption process. Said organic dedusting agent according to the present invention comprises a variety of high boiling point non-toxic substances such as edible oil, silicone oil, modified silicone oil, liquid asphalt oil, tung seed oil, liquid paraffin oil, mineral oil, palm oil and the like. Said organic dedusting agent has good solubility, abundant source, stable nature and can be recycled at high temperatures for use; moreover, the organic dedusting agent has a high vapor pressure, thus a secondary pollution by vaporization can be avoided significantly, and HCl, HF, dioxins, polycyclic aromatic hydrocarbons, other organic substances, heavy metal compounds and the like in the waste gas can be removed simultaneously.

Said dedusting process and organic dedusting agent according to the present invention can be used for purifying boiler flue gases, waste incineration exhaust gases and waste gases generated by the combustion of various combustible substances, and the purified gas after dedusting can be subjected to a desulfurization or denitration process section for a further desulfurization and/or denitration treatment.

DETAILED DESCRIPTION OF EMBODIMENTS

The waste gas dedusting technical process and apparatus according to the present invention will be described below in conjunction with specific embodiments. Said embodiments are intended to better illustrate the present invention, and should not be construed as limitations to the claims of the present invention.

Figure 1:
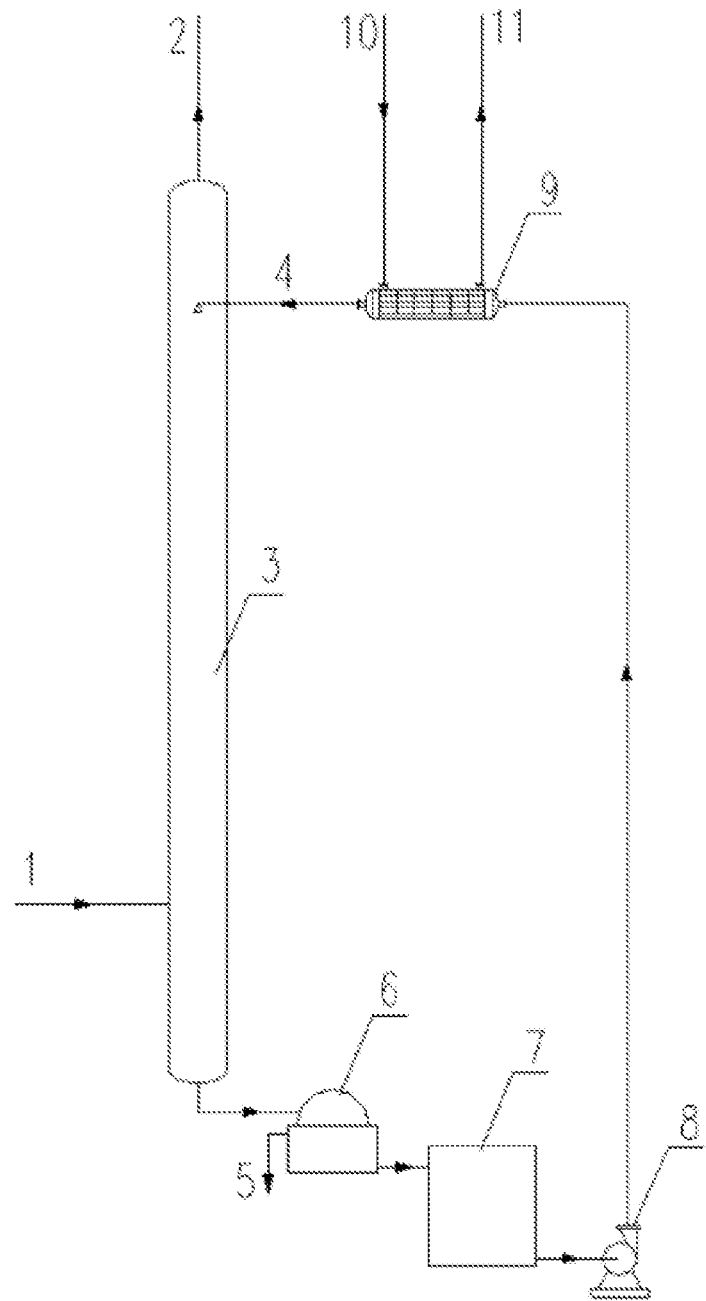
FIG. 1 is a schematic diagram illustrating technical process and apparatus for countercurrent waste gas dedusting, in which: 1 represents a waste gas before dedusting, 2 represents a waste gas after purification, 3 represents a countercurrent dedusting tower, 4 represents an organic dedusting agent, 5 represents ash dregs, 6 represents a filter, 7 represents a storage tank, 8 represents a circulation pump, 9 represents a heat exchanger, 10 represents a coolant, and 11 represents a coolant that is warmed.

The operation methods are as follows:

A countercurrent waste gas dedusting technical process and an apparatus are shown in FIG. 1: in operation, a waste gas before dedusting 1 is introduced into a countercurrent dedusting tower 3 from bottom, an organic dedusting agent 4 is introduced into the countercurrent dedusting tower 3 from top, and the waste gas before dedusting 1 and the organic dedusting agent 4 come into contact countercurrently in the countercurrent dedusting tower 3; dusts, HCl, HF, dioxins, polycyclic aromatic hydrocarbons, other organic substances, heavy metal compounds and the like in the waste gas before dedusting 1 are adsorbed by the organic dedusting agent 4 and condensed water, thus the waste gas before dedusting 1 is converted into a waste gas after purification 2 and vented from the top of the countercurrent dedusting tower 3; a mixed solution of the organic dedusting agent 4 that has adsorbed dusts, HCl, HF, dioxins, polycyclic aromatic hydrocarbons, other organic substances, heavy metal compounds and the like and the condensed water is collected at the bottom of the countercurrent dedusting tower 3, then flows out from the bottom of the countercurrent dedusting tower 3 and enters a filter 6 for filtration; the separated ash dregs 5 are discharged from the filter 6, and the filtrate enters a storage tank 7, precipitates and becomes layered; the bottom is an aqueous layer containing HCl, HF, dioxins, polycyclic aromatic hydrocarbons, other organic substances, heavy metal compounds and the like, which is discharged, and further treated or recycled for use; the organic dedusting agent at the upper layer is delivered by a circulation pump 8, and cooled down by a coolant 10 in a heat exchanger 9, thus is converted into a clean organic dedusting agent 4 and enters the countercurrent dedusting tower 3 for reuse; after absorbing heat from the organic dedusting agent 4, the coolant 10 is converted into a coolant that is warmed 11, which can be utilized for afterheat recovery; in the case that the waste gas before dedusting 1 does not need to be cooled down, the clean organic dedusting agent 4 delivered by the circulation pump 8 can be introduced directly into the countercurrent dedusting tower 3, in which case the heat exchanger 9, the coolant 10 and the coolant that is warmed 11 in the industrial process may be omitted.

Figure 2:
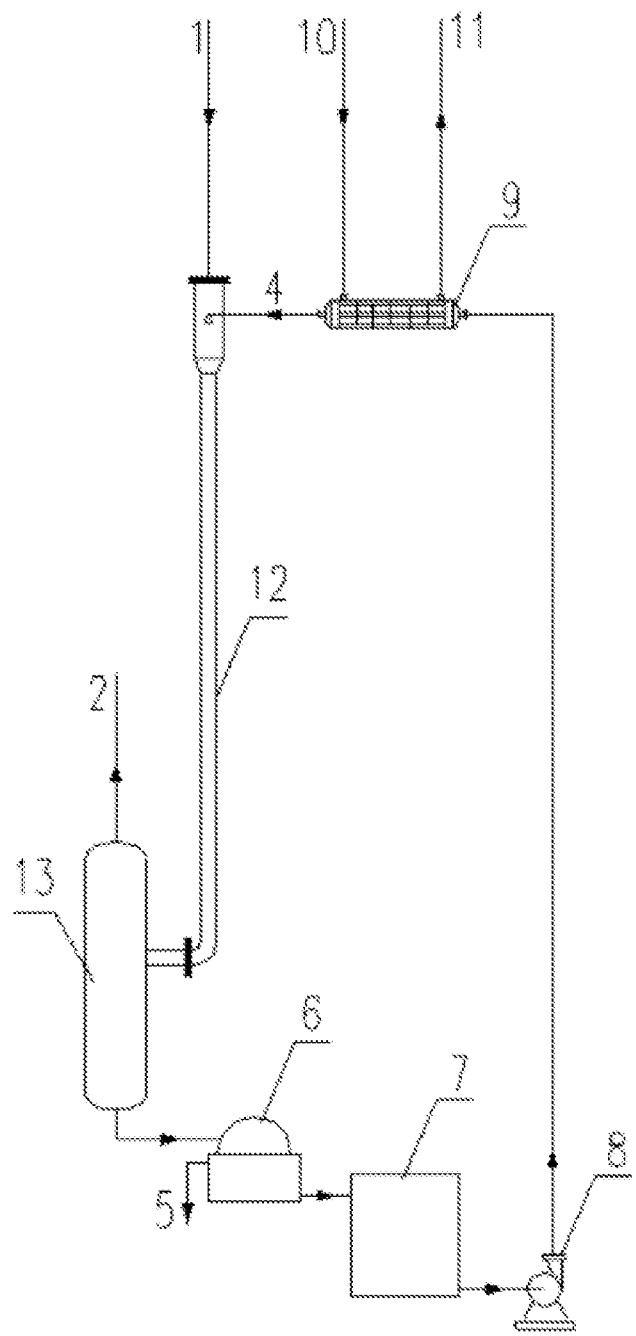
FIG. 2 is a schematic diagram illustrating technical process and apparatus for cocurrent waste gas dedusting, in which: 1 represents a waste gas before dedusting, 2 represents a waste gas after purification, 4 represents an organic dedusting agent, 5 represents ash dregs, 6 represents a filter, 7 represents a storage tank, 8 represents a circulation pump, 9 represents a heat exchanger, 10 represents a coolant, 11 represents a coolant that is warmed, 12 represents a cocurrent dedusting tower, and 13 represents a gas-liquid separator.

A cocurrent waste gas dedusting technical process and an apparatus are shown in FIG. 2: in operation, a waste gas before dedusting 1 is introduced into a cocurrent dedusting tower 12 from top, an organic dedusting agent 4 is also introduced into the cocurrent dedusting tower 12 from top, and the waste gas before dedusting 1 and the organic dedusting agent 4 come into contact cocurrently in the cocurrent dedusting tower 12; dusts, HCl, HF, dioxins, polycyclic aromatic hydrocarbons, other organic substances, heavy metal compounds and the like in the waste gas before dedusting 1 are adsorbed by the organic dedusting agent 4 and condensed water, thus the waste gas before dedusting 1 is converted into a waste gas after purification 2, and enters a gas-liquid separator 13 from the bottom of the cocurrent dedusting tower 12 for gas-liquid separation, and then vented from the top of the gas-liquid separator 13; a mixed solution of the organic dedusting agent 4 that has adsorbed dusts, HCl, HF, dioxins, polycyclic aromatic hydrocarbons, other organic substances, heavy metal compounds and the like and the condensed water is collected at the bottom of the cocurrent dedusting tower 12, enters the gas-liquid separator 13 for gas-liquid separation, then flows out from the bottom of the gas-liquid separator 13 and enters a filter 6 for filtration; the separated ash dregs 5 are discharged from the filter 6, and the filtrate enters a storage tank 7, precipitates and becomes layered; the bottom is an aqueous layer containing HCl, HF, dioxins, polycyclic aromatic hydrocarbons, other organic substances, heavy metal compounds and the like, which is discharged, and further treated or recycled for use; the organic dedusting agent 4 at the upper layer is delivered by a dedusting pump 8, and cooled down by a coolant 10 in a heat exchanger 9, thus is converted into a clean organic dedusting agent 4 and enters the cocurrent dedusting tower 12 for reuse; after absorbing heat from the organic dedusting agent, the coolant 10 is converted into a coolant that is warmed 11, which can be utilized for afterheat recovery; in the case that the waste gas before dedusting 1 does not need to be cooled down, the clean organic dedusting agent 4 delivered by the circulation pump 8 can be introduced directly into the cocurrent dedusting tower 12, in which case the heat exchanger 9, the coolant 10 and the coolant that is warmed 11 in the industrial process may be omitted.

Figure 3:
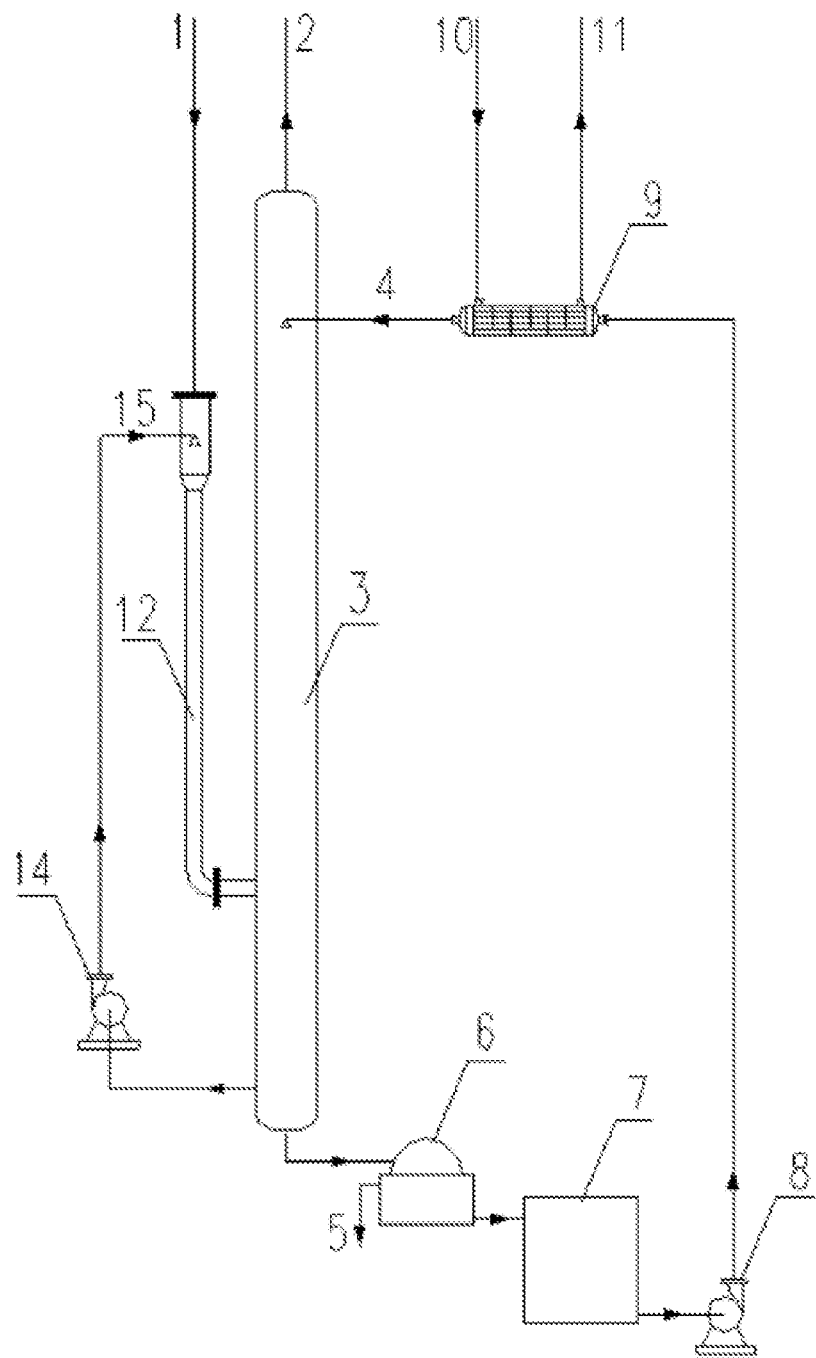
FIG. 3 is a schematic diagram illustrating technical process and apparatus for hybrid-current waste gas dedusting, in which: 1 represents a waste gas before dedusting, 2 represents a waste gas after purification, 3 represents a countercurrent dedusting tower, 4 represents an organic dedusting agent, 5 represents ash dregs, 6 represents a filter, 7 represents a storage tank, 8 represents a circulation pump, 9 represents a heat exchanger, 10 represents a coolant, 11 represents a coolant that is warmed, 12 represents a cocurrent dedusting tower, 14 represents an internal circulation pump, and 15 represents an internal circulation dedusting agent.

A hybrid-current waste gas dedusting technical process and an apparatus are shown in FIG. 3: in operation, a waste gas before dedusting 1 is introduced into a cocurrent dedusting tower 12 from top, and an internal circulation dedusting agent 15 extracted by an internal circulation pump 14 from the bottom of a countercurrent dedusting tower 3 is also introduced into the cocurrent dedusting tower 12 from top; the waste gas before dedusting 1 and the internal circulation dedusting agent 15 come into contact cocurrently in the cocurrent dedusting tower 12, most of the dusts, HCl, HF, dioxins, polycyclic aromatic hydrocarbons, other organic substances, heavy metal compounds and the like in the waste gas before dedusting 1 are adsorbed by the internal circulation dedusting agent 15 and condensed water, thus a gas-liquid mixture is formed, and enters the countercurrent dedusting tower 3 from the bottom of the cocurrent dedusting tower 12; at the bottom of the countercurrent dedusting tower 3, the internal circulation dedusting agent 15 is separated from the partially purified waste gas before dedusting 1; the waste gas is introduced into the countercurrent dedusting tower 3 from bottom, the organic dedusting agent 4 is introduced into the countercurrent dedusting tower 3 from top, and the partially purified waste gas and the organic dedusting agent 4 come into contact countercurrently in the countercurrent dedusting tower 3; the remaining dusts, HCl, HF, dioxins, polycyclic aromatic hydrocarbons, other organic substances, heavy metal compounds and the like in the waste gas are adsorbed by the organic dedusting agent 4 and condensed water, the waste gas is converted into a waste gas after purification 2 and vented from the top of the countercurrent dedusting tower 3; a mixed solution of the organic dedusting agent 4 that has absorbed dusts, HCl, HF, dioxins, polycyclic aromatic hydrocarbons, other organic substances, heavy metal compounds and the like and the condensed water is collected at the bottom of the countercurrent dedusting tower 3, part of the mixed solution is extracted by the internal circulation pump 14 as the internal circulation dedusting agent 15 and enters the cocurrent dedusting tower 12 from top for recycle use, the remainder flows out from the bottom of the countercurrent dedusting tower 3, and enters the filter 6 for filtration; the separated ash dregs 5 are discharged from the filter 6, and the filtrate enters a storage tank 7, precipitates and becomes layered; the bottom is an aqueous layer containing HCl, HF, dioxins, polycyclic aromatic hydrocarbons, other organic substances, heavy metal compounds and the like, which is discharged, and further treated or recycled for use; the organic dedusting agent at the upper layer is delivered by a dedusting pump 8, and cooled down by a coolant 10 in a heat exchanger 9, thus is converted into a clean organic dedusting agent 4 and enters the countercurrent dedusting tower 3 for reuse; after absorbing heat from the dedusting agent, the coolant 10 is converted into a coolant that is warmed 11, which can be utilized for afterheat recovery; in this technical process, the internal circulation dedusting agent 15 may also be replaced by the clean organic dedusting agent 4, in which case the internal circulation pump 14 may be omitted; consequently, the clean organic dedusting agent 4 coming out from the heat exchanger 9 should be divided into two streams, one enters the countercurrent dedusting tower 3, and the other enters the cocurrent dedusting tower 12 directly from top; in the case that the waste gas before dedusting 1 does not need to be cooled down, the clean organic dedusting agent 4 delivered by the circulation pump 8 can be introduced directly into the countercurrent dedusting tower 3, in which case the heat exchanger 9, the coolant 10 and the coolant that is warmed 11 in the industrial process may be omitted.

Figure 4:
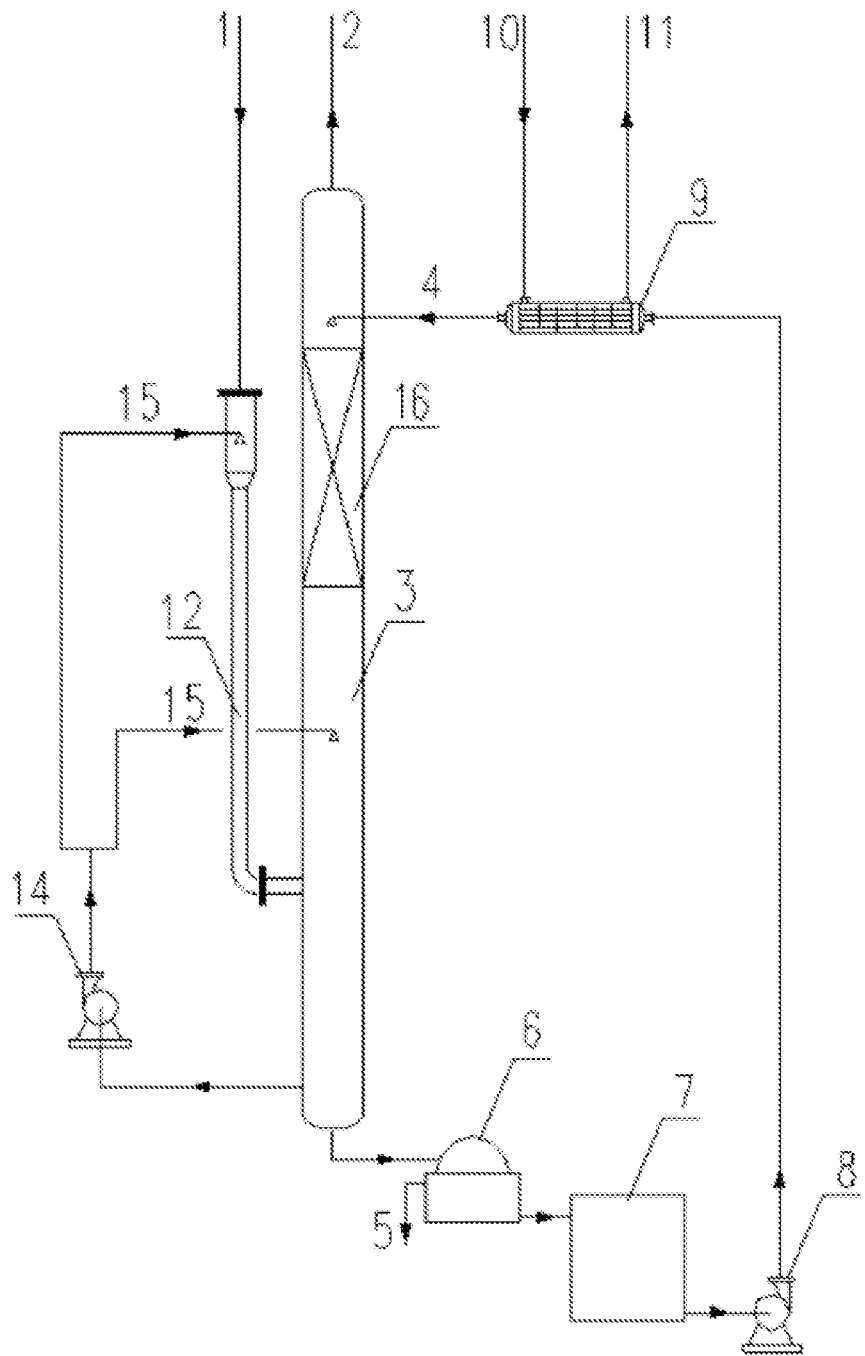
FIG. 4 is another schematic diagram illustrating technical process and apparatus for hybrid-current waste gas dedusting, in which: 1 represents a waste gas before dedusting, 2 represents a waste gas after purification, 3 represents a countercurrent dedusting tower, 4 represents an organic dedusting agent, 5 represents ash dregs, 6 represents a filter, 7 represents a storage tank, 8 represents a circulation pump, 9 represents a heat exchanger, 10 represents a coolant, 11 represents a coolant that is warmed, 12 represents a cocurrent dedusting tower, 14 represents an internal circulation pump, 15 represents an internal circulation dedusting agent (part of the internal circulation dedusting agent is sprayed partially from the top of the cocurrent dedusting tower 12 used for pressurizing and dedusting and contacts with the dust-containing waste gas cocurrently, and another part of the internal circulation dedusting agent is sprayed from the middle part of the countercurrent dedusting tower 3 and contacts with the dust-containing waste gas countercurrently), and 16 represents a packing layer.

As shown in FIG. 4: in the technical process of hybrid-current waste gas dedusting, the internal circulation dedusting agent 15 may also be divided into two streams, one is sprayed from the top of the cocurrent dedusting tower 12 used for pressurizing and dedusting and directly contacts with the dust-containing waste gas 1 cocurrently, and the other is sprayed from the middle part of the countercurrent dedusting tower 3 and contacts with the preliminarily purified dust-containing waste gas countercurrently; a packing layer 16 may also be provided in the countercurrent dedusting tower 3 to improve the condensation efficiency.

In Example 1, a laboratory absorption bottle was used, and 200 ml of modified silicone oil was charged into the absorption bottle. Dedusting test was carried out as follows: in Huzhou, Zhejiang province, a company utilized petroleum cokes as raw materials to produce glass with a production of 800 tons per day; its kiln exhaust gas was passed through a bag-type dedustor, and an exhaust gas was extracted directly from a pipeline thereof; A 1 $Nm^3$ exhaust gas was extracted, passed through the absorption bottle, and was absorbed by the 200 ml modified silicone oil in the absorption bottle; the 200 ml modified silicone oil with absorbed dusts was subjected to centrifugal separation, whereupon four layers were formed in the centrifuge tube after the centrifugal separation: the bottom layer was a layer of dregs, followed by an aqueous layer, then was a layer of solid organic substances, and the uppermost layer was a layer of modified silicone oil; By drying and weighing, the layer of ash dregs weighed 2.3546 g, and the layer of solid organic substances weighed 0.3213 g; thus the content of dusts and organic substances in the glass kiln combustion exhaust gas after bag-type dedusting was 2.3546 g+0.3213 g=2.6759 $g/Nm^3$, whereas in actual production, the dust content detected by an instrument was only around 0.8 $g/Nm^3$, indicating that the method of the present invention has a dedusting efficiency much higher than that of the methods used in actual production.

In Example 2, a laboratory absorption bottle was used, and a 200 ml mixture of peanut oil and modified silicone oil was charged into the absorption bottle. Dedusting test was carried out as follows: in Hainan province, a company utilized natural gases as raw materials to produce glass with a production of 600 tons per day; its kiln exhaust gas was subjected to denitration and alkaline desulfurization, and an exhaust gas was extracted directly from a pipeline thereof; A 0.6 $Nm^3$ exhaust gas was extracted, passed through the absorption bottle, and was absorbed by the 200 ml mixture of peanut oil and modified silicone oil in the absorption bottle; the 200 ml mixture of peanut oil and modified silicone oil with absorbed dusts was subjected to centrifugal separation, whereupon three layers were formed in the centrifuge tube after the centrifugal separation: the bottom layer was a layer of dregs, followed by an aqueous layer, and the uppermost layer was a mixed liquid layer of peanut oil and modified silicone oil; By drying and weighing, the layer of ash dregs weighed 0.5347 g; thus the content of dusts in the glass kiln combustion exhaust gas after denitration and alkaline desulfurization was 0.5347 g/0.6=0.8911 $g/Nm^3$, whereas in actual production, the enterprise detected a dust content of less than 0.1 $g/Nm^3$, indicating that the method of the present invention has a dedusting efficiency much higher than that of the methods used in actual production.

What is claimed is:
1. A waste gas dedusting method, comprising:
   feeding a dust-containing waste gas and an organic dedusting agent into a dedusting tower; condensing at least a part of water vapor in the dust-containing waste gas;
   adsorbing solid particles, acidic contaminants, organic contaminants and/or heavy metal compounds in the dust-containing waste gas using the organic dedusting agent and the condensed water; and
   obtaining a purified gas and a waste liquid from the dedusting tower, wherein the organic dedusting agent comprises a nontoxic high boiling point organic solvent composition that contains two or more oils selected from the group consisting of edible oil, silicone oil, modified silicone oil, liquid asphalt oil, tung seed oil, liquid paraffin oil, mineral oil, palm oil, and waste cooking oil, and wherein the waste liquid comprises the organic dedusting agent and the condensed water.

2. The waste gas dedusting method of claim 1, further comprising: filtering the waste liquid to obtain a solid waste and a filtrate, and settling the filtrate in a storage tank wherein the filtrate is separated into a upper layer comprising the organic dedusting agent and a lower layer comprising an aqueous solution; discharging the aqueous solution; and feeding the upper layer containing the organic dedusting agent to the dedusting tower.

3. The waste gas dedusting method of claim 2, further comprising cooling the organic dedusting agent in a heat exchanger prior to feeding the organic dedusting agent to the dedusting tower.

4. The waste gas dedusting method of claim 1, wherein the dust-containing waste gas and the organic dedusting agent flow countercurrently in the dedusting tower.

5. The waste gas dedusting method of claim 3, comprising: pre-washing the dust-containing waste gas by concurrently flowing the dust-containing waste gas and a first portion of the waste liquid from the dedusting tower through a tubular device before entering a lower part of the dedusting tower.

6. The waste gas dedusting method of claim 5, feeding a second portion of waste liquid from the dedusting tower back into a middle part of the dedusting tower.

7. The waste gas dedusting method of claim 1, wherein the dust-containing waste gas and the organic dedusting agent flow cocurrently in the dedusting tower.

8. The waste gas dedusting method of claim 1, wherein the organic dedusting agent fed into the dedusting tower has a temperature lower than 80° C.

9. The waste gas dedusting method of claim 1, wherein the edible oil is selected from the group consisting of peanut oil, salad oil, olive oil, castor oil, camellia seed oil, rape seed oil, corn oil, plant germ oil, soybean oil, and mixtures thereof.

10. The waste gas dedusting method of claim 1, wherein the organic dedusting agent comprises a silicone oil or a modified silicone oil.

11. The waste gas dedusting method of claim 10, wherein the modified silicone oil is a silicone oil modified by hydroxylation, amination, carboxylation, and/or acylation.

* * * * *